United States Patent
Das et al.

(10) Patent No.: US 10,248,801 B2
(45) Date of Patent: Apr. 2, 2019

(54) SYSTEMS AND METHODS FOR ROLE-BASED FILE ACCESS CONTROL

(71) Applicant: AMERICAN EXPRESS TRAVEL RELATED SERVICES COMPANY, INC., New York, NY (US)

(72) Inventors: Debasish Das, New York, NY (US); Kunal Joshi, Jersey City, NJ (US); Matthew Meyer, Brooklyn, NY (US); Jeremy Seideman, Brooklyn, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 217 days.

(21) Appl. No.: 15/288,938

(22) Filed: Oct. 7, 2016

(65) Prior Publication Data
US 2018/0101691 A1      Apr. 12, 2018

(51) Int. Cl.
*G06F 17/30* (2006.01)
*G06F 21/62* (2013.01)
*H04L 29/06* (2006.01)

(52) U.S. Cl.
CPC .... *G06F 21/6209* (2013.01); *G06F 17/30082* (2013.01); *H04L 63/102* (2013.01); *H04L 63/104* (2013.01); *G06F 17/3007* (2013.01); *G06F 21/6218* (2013.01); *G06F 2221/2141* (2013.01)

(58) Field of Classification Search
CPC ............. G06F 21/6209; G06F 17/3007; G06F 21/6218; G06F 17/30082; G06F 2221/2141; H04L 63/102; H04L 63/104
USPC ......................................................... 707/783
See application file for complete search history.

(56) References Cited

U.S. PATENT DOCUMENTS

| | | | | |
|---|---|---|---|---|
| 8,417,678 B2* | 4/2013 | Bone | ................ | G06F 17/30221 707/694 |
| 8,612,404 B2* | 12/2013 | Bone | ................ | G06F 17/30144 707/637 |
| 10,095,701 B1* | 10/2018 | Faibish | ............ | G06F 17/30123 |
| 2014/0201850 A1* | 7/2014 | Garcia | ................ | G06F 21/6209 726/28 |
| 2016/0092467 A1* | 3/2016 | Lee | .................. | G06F 17/30203 707/827 |

(Continued)

OTHER PUBLICATIONS

Do, Quang, et al., "Enforcing File System Permissions on Android External Storage", TrustCom 2014, Beijing, China Sep. 24-26, 2014, pp. 949-954.*

(Continued)

*Primary Examiner* — Robert Stevens
(74) *Attorney, Agent, or Firm* — Snell & Wilmer, L.L.P.

(57) ABSTRACT

A system for applying access permissions to read requests may write a file to a storage media. The file may contain data, an embedded flag, and an embedded verification datum of the embedded flag. The embedded flag may indicate an access permissions requisite for file access. The system may also receive a request to access the file from a user and retrieve an access permission for the user. The system may also compare the embedded flag to the access permission for the user to determine the user has permission to access the file. A verification datum may be calculated, and the calculated verification datum may be compared to the embedded verification datum to determine the embedded flag has not changed.

20 Claims, 7 Drawing Sheets

(56) References Cited

U.S. PATENT DOCUMENTS

2016/0092639 A1* 3/2016 Padmani ............... G06F 19/327
  705/2
2016/0350017 A1* 12/2016 Amir ..................... G06F 3/0611

OTHER PUBLICATIONS

Gamble, Todd, "Implementing Execution Controls in Unix", LISA '93, Monterey, CA, Nov. 1993, USENIX, 7 pages.*
Moyer, Matthew J., et al., "Generalized Role-Based Access Control", ICDSC 2001, Mesa, AZ, Apr. 16-19, 2001, pp. 391-398.*
"File system permissions", Wikipedia, downloaded from: en.wikipedia.org/wiki/File_system_permissions, pp. 1-6.*
"Distributed File System (DFS)", technopedia, downloaded from: www.techopedia.com/definition/1825/distributed-file-system-dfs, 7/Jul. 2018, 1 page.*
Microsoft Computer Dictionary, 5th Edition, Microsoft Press, Redmond, WA, © 2002, pp. 141 and 442-443.*

* cited by examiner

SYSTEMS AND METHODS FOR ROLE-BASED FILE ACCESS CONTROL

FIELD

This disclosure relates to systems and methods for enforcing robust data access controls.

BACKGROUND

Large data sets may exist in various levels of size and organization. With big data comprising data sets as large as ever, the volume of data collected incident to the increased popularity of online and electronic transactions continues to grow. Billions of rows and hundreds of thousands of columns worth of data may populate a single table, for example. Different users may desire to access different portions of the large volume of data populating the table. However, different portions of the table may have different security restrictions. For instance, some portions may contain personally identifiable information that should have higher security. Portions of the table and/or the entire table may be encrypted at rest. Different users may have different permissions specific to their roles, identities, and the row and/or column of the table desired to be accessed. However, the size and varied structure of big data sets is often incompatible with traditional data protection techniques.

Moreover, once access controls are in place enforcement can be difficult in any data environment. Permissions may change over time. For example, a developer may have access to sensitive information for the duration of a specific project, during which he appropriately makes a copy of the data file in his folder. The developer may later have that permission to access the data removed after completing the project, for example. However, the developer would still have access to the copied file, of which he is the owner, in traditional file systems. Since the developer has inadvertently copied restricted data to a new location, and owns the file in which it is stored and/or changes the access permissions for the file, typical systems may not detect his access. Similarly, a user with access permissions may copy a file into an unauthorized user's directory with the unauthorized user designated as the owner. Thus, the unauthorized user would have impermissible access to restricted data in many existing file systems.

SUMMARY

A system, method, and computer readable medium (collectively, the "system") is disclosed for applying role-based access permissions embedded in a file to file read request. In various embodiments, the system may write a file to a storage media with the file containing data, an embedded flag, and an embedded verification datum of an embedded flag. The embedded flag may indicate an access permissions requisite for file access. The system may also receive a request to access the file from a user and retrieve an access permission for the user. The system may also compare the embedded flag to the access permission for the user to determine the user has permission to access the file. A verification datum may be calculated, and the calculated verification datum may be compared to the embedded verification datum to determine that the embedded flag has not changed.

In various embodiments, the system may identify the access permission associated with the embedded flag as requisite for file access and write it to the file. The embedded flag may include a bit flag and/or a string. The system may execute a checksum to calculate the embedded verification datum. The system may also determine that the embedded flag has not changed in response to the embedded verification datum completely matching the calculated verification datum. The data storage system may include a distributed file system, and the access permission for the user may be retrieved from a permissions database.

In various embodiments, the system may a receive request to write a file comprising data retrieved from the data storage system. The system may identify an access permission requisite to read the data from the data storage system. The system may also write the file containing the data and the access permission requisite to read the data. The system may receive a request to access the file from a user, and retrieve an access permission for the user as well as the access permission requisite to read the data. The system may further compare the access permission requisite to read the data to the access permission for the user to determine the user has permission to access the file.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein refers to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The present disclosure provides systems, methods, and computer program products for embedding role-based access controls in files. The systems may use the "extended attributes" that are part of most portable operating system interface (POSIX) compliant file systems to define two attributes: permitted roles and a validation datum (e.g., a checksum). The validation datum may be calculated from the permitted roles and used to validate the state of the permitted roles written to the file. The role attribute is an encoding of the roles that a user needs to have to access the file. The validation datum prevents tampering.

The systems include secure access to data by automatically tagging files with the requisite access roles to access the file. The access roles may be built from an access permission database. When the file is read, the current access roles for the user conducting the file read are checked against the files list of requisite roles. The user is unable to access the file, even if the user owns it, in response to the user not having the requisite access roles. The access permissions are inherited from the user's own roles or from associated files in response to the file being written. The access permissions are not subject to modification by user commands. Rather, the access permissions are based on the data stored in a file and the permissions used to retrieve the data when the file was originally written. The role-based access systems are immune to commands that change file permissions and/or ownership (e.g., the chmod command in Linux environments). The role-based access systems are also self-contained and have a negligible impact on file sizes. It may be implemented as a layer within the file system itself, or it may be implemented as an external application.

Figure 1:
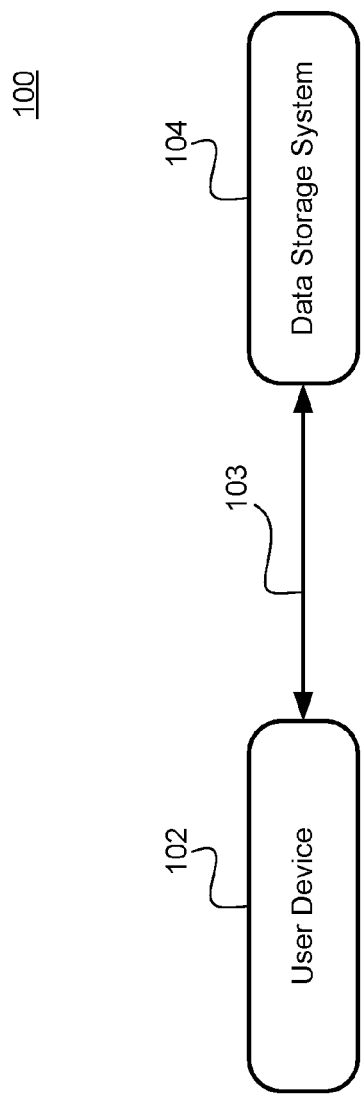
FIG. 1 illustrates an exemplary system for implementing role-based access control, in accordance with various embodiments.

With reference to FIG. 1, an exemplary data access system 100 is provided for applying role-based access permissions, in accordance with various embodiments. Data access system 100 may include user devices 102 and applications in electronic communication with data storage system 104 over a network 103. User devices 102 may include a computer or processor, or a set of computers/processors, such as a personal computer. However, other types of computing units or systems may be used, including laptops, notebooks, hand held computers, personal digital assistants, cellular phones, smart phones (e.g., iPhone®, BlackBerry®, Android®, etc.) tablets, wearables, Internet of Things (IoT) devices, or any other device capable of sending and/or receiving data over the network.

A network may be any suitable electronic link capable of carrying communication between two or more computing devices. For example, the network may be local area network using TCP/IP communication or wide area network using communication over the Internet. The network may also be an internal network isolated from the Internet.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, data storage system 104 may be also be a computing device or system of computing devices similar to or the same as those described above configured to support data writing and retrieval. For example, data storage system 104 may be a big data system as described below with reference to FIGS. 2 and 3. Data storage system 104 may respond to file request (e.g., read and write) received from user device 102 by verifying the user, device, and/or application requesting file access has appropriate role-based access permissions.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big-data storage formats containing millions of records (i.e., rows) and numerous variables (i.e., columns) for each record.

Figure 2:
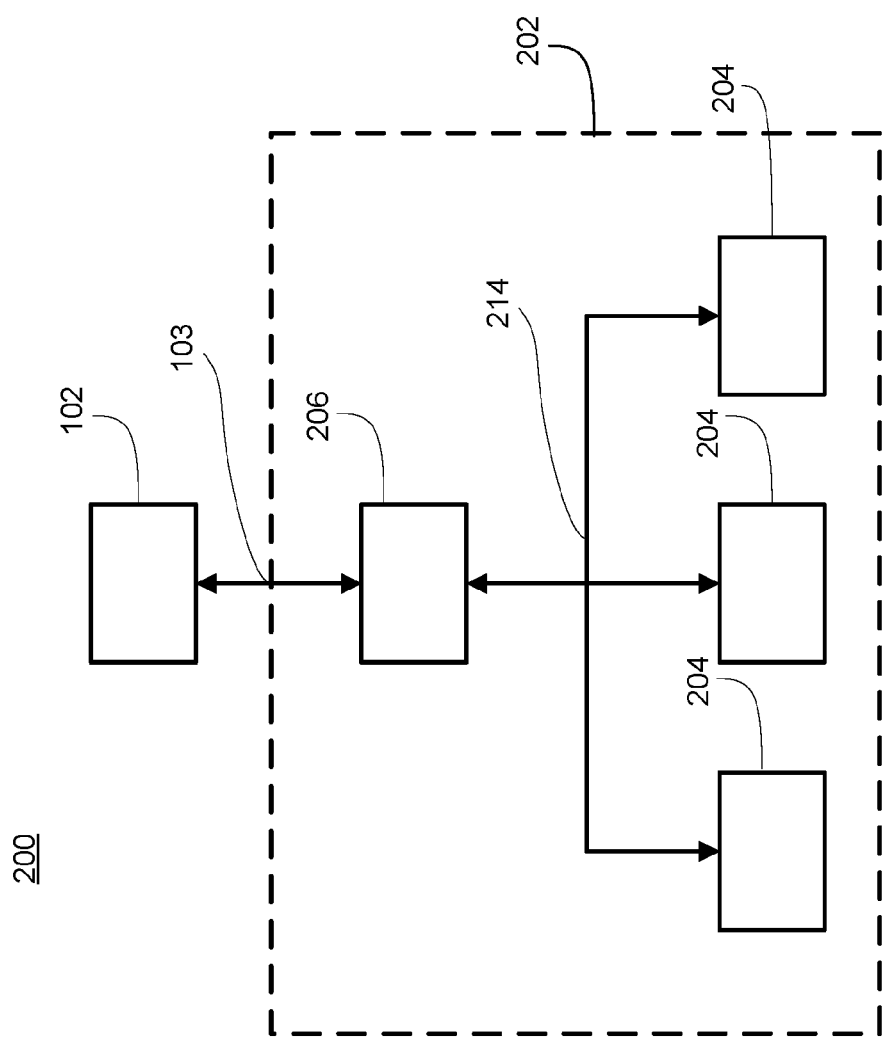
FIG. 2 illustrates an exemplary system for storing, reading, and writing big data files with role-based access controls, in accordance with various embodiments.

With reference to FIG. 2, data storage system 104 may be a distributed file system (DFS) 200 as shown, in accordance with various embodiments. DFS 200 comprises a distributed computing cluster 202 configured for parallel processing and storage. Distributed computing cluster 202 may comprise a plurality of nodes 204 in electronic communication with each of the other nodes, as well as a control node 206. Processing tasks may be split among the nodes of distributed computing cluster 202 to improve throughput and enhance storage capacity. Distributed computing cluster may be, for example, a Hadoop® cluster configured to process and store big data sets with some of nodes 204 comprising a distributed storage system and some of nodes 204 comprising a distributed processing system. In that regard, distributed computing cluster 202 may be configured to support a Hadoop® distributed file system (HDFS) as specified by the Apache Software Foundation at http://hadoop.apache.org/docs/.

In various embodiments, nodes 204, control node 206, and user device 102 may comprise any devices capable of receiving and/or processing an electronic message via network 103 and/or network 214. For example, nodes 204 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, user device 102 may submit requests to control node 206. Control node 206 may distribute the tasks among nodes 204 for processing to complete the job intelligently. Control node 206 may limit network traffic and enhance the speed at which incoming data is processed. In that regard, user device 102 may be a separate machine from distributed computing cluster 202 in electronic communication with distributed computing cluster 202 via network 103. Nodes 204 and control node 206 may similarly be in communication with one another over network 214. Network 214 may be an internal network isolated from the Internet and user device 102, or, network 214 may comprise an external connection to enable direct electronic communication with user device 102 and the Internet.

In various embodiments, DFS 200 may process hundreds of thousands of records from a single data source. DFS 200 may also ingest data from hundreds of data sources. Nodes 204 may process the data in parallel to expedite the processing. Furthermore, the transformation and intake of data as disclosed below may be carried out in memory on nodes 204. For example, in response to receiving a source data file of 100,000 records, a system with 100 nodes 204 may distribute the task of processing 1,000 records to each node 204. Each node 204 may then process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 3:
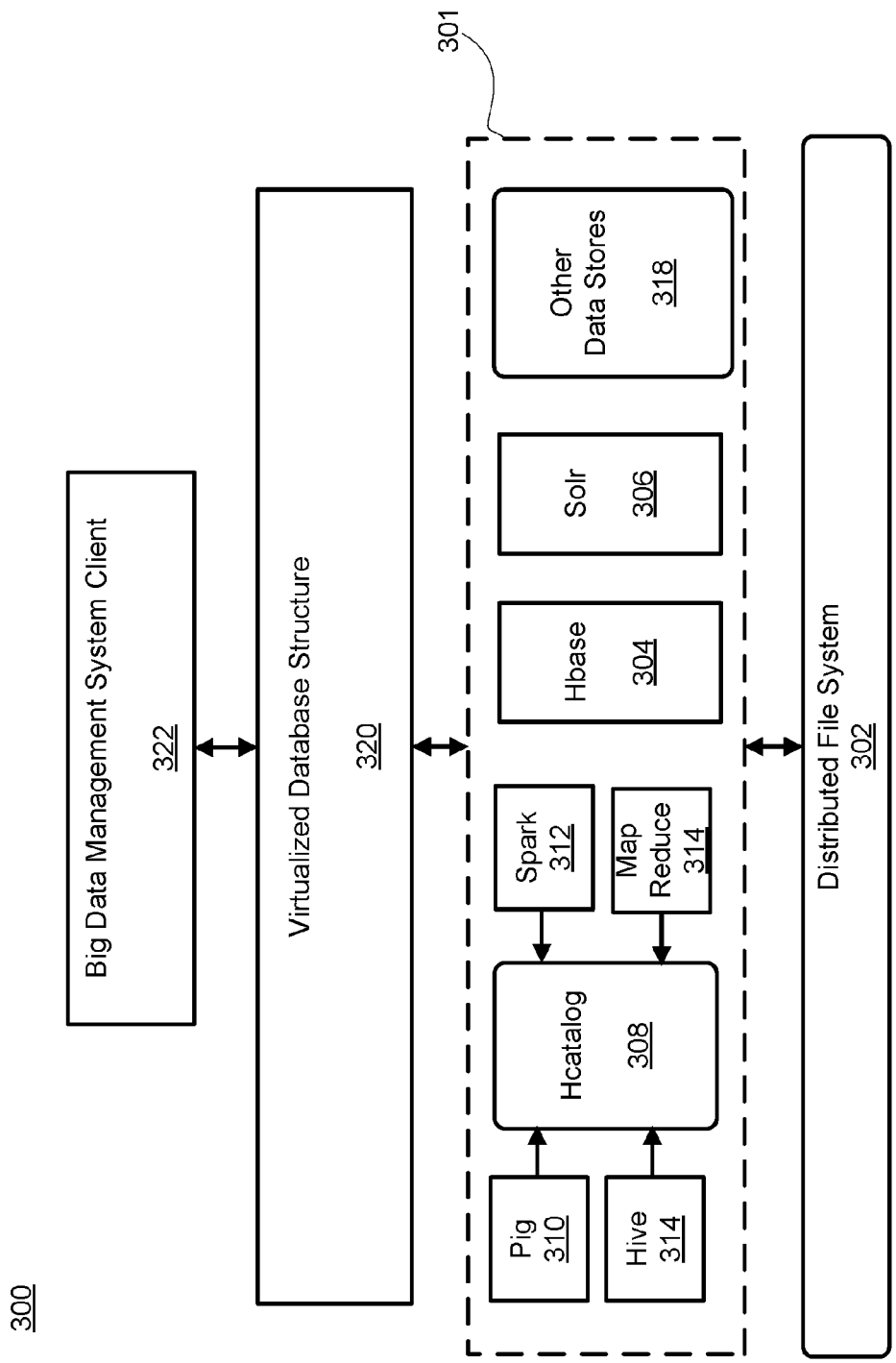
FIG. 3 illustrates an exemplary big data management system supporting a unified, virtualized interface for multiple data storage types having role-based access controls, in accordance with various embodiments.

With reference to FIG. 3, an exemplary architecture of a big data management system (BDMS) 300 is shown, in accordance with various embodiments. BDMS 300 may be similar to or identical to DFS 200 of FIG. 2, for example. DFS 302 may serve as the physical storage medium for the various data storage formats 301 of DFS 302. A non-relational database 304 may be maintained on DFS 302. For example, non-relational database 304 may comprise an HBase™ storage format that provides random, real time read and/or write access to data, as described and made available by the Apache Software Foundation at http://hbase.apache.org/.

In various embodiments, a search platform 306 may be maintained on DFS 302. Search platform 306 may provide distributed indexing and load balancing to support fast and reliable search results. For example, search platform 306 may comprise a Solr® search platform as described and made available by the Apache Software Foundation at http://lucene.apache.org/solr/.

In various embodiments, a data warehouse 314 such as Hive® may be maintained on DFS 302. The data warehouse 314 may support data summarization, query, and analysis of warehoused data. For example, data warehouse 314 may be a Hive® data warehouse built on Hadoop® infrastructure. A data analysis framework 310 may also be built on DFS 302 to provide data analysis tools on the distributed system. Data analysis framework 310 may include an analysis runtime environment and an interface syntax such similar to those offered in the Pig platform as described and made available by the Apache Software Foundation at https://pig.apache.org/.

In various embodiments, a cluster computing engine 312 for high-speed, large-scale data processing may also be built on DFS 302. For example, cluster computing engine 312 may comprise an Apache Spark™ computing framework running on DFS 302. DFS 302 may further support a MapReduce layer 316 for processing big data sets in a parallel, distributed manner to produce records for data storage formats 301. For example, MapReduce layer 316 may be a Hadoop® MapReduce framework distributed with the Hadoop® HDFS as specified by the Apache Software Foundation at http://hadoop.apache.org/docs/. The cluster computing engine 312 and MapReduce layer 316 may ingest data for processing, transformation, and storage in data storage formats 301 using the distributed processing and storage capabilities of DFS 302.

In various embodiments, DFS 302 may also support a table and storage management layer 308 such as, for example, an HCatalog installation. Table and storage management layer 308 may provide an interface for reading and writing data for multiple related storage formats. Continuing the above example, an HCatalog installation may provide an interface for one or more of the interrelated technologies described above such as, for example, Hive®, Pig, Spark®, and Hadoop® MapReduce.

In various embodiments, DFS 302 may also include various other data storage formats 318. Other data storage formats 318 may have various interface languages with varying syntax to read and/or write data. In fact, each of the above disclosed storage formats may vary in query syntax and interface techniques. Virtualized database structure 320 may provide a uniform, integrated user experience by offering users a single interface point for the various different data storage formats 301 maintained on DFS 302. Virtualized database structure 320 may be a software and/or hardware layer that makes the underlying data storage formats 301 transparent to client 322 by providing variables on request. Client 322 may request and access data by requesting variables from virtualized database structure 320. Virtualized database structure 320 may then access the variables using the various interfaces of the various data storage formats 301 and return the variables to client 322.

In various embodiments, the data stored using various above disclosed data storage formats 301 may be stored across data storage formats 301 and accessed at a single point through virtualized database structure 320. The variables accessible through virtualized database structure 320 may be similar to a column in a table of a traditional RDBMS. That is, the variables identify data fields available in the various data storage formats 301.

In various embodiments, variables may be stored in a single one of the data storage formats 301 or replicated across numerous data storage formats 301 to support different access characteristics. Virtualized database structure 320 may comprise a catalog of the various variables available in the various data storage formats 301. The cataloged variables enable BDMS 300 to identify and locate variables stored across different data storage formats 301 on DFS 302. Variables may be stored in at least one storage format on DFS 302 and may be replicated to multiple storage formats on DFS 302. The catalog of virtualized database structure 320 may track the location of a variable available in multiple storage formats.

The variables may be cataloged as they are ingested and stored using data storage formats 301. The catalog may track the location of variables by identifying the storage format, the table, and/or the variable name for each variable available through virtualized database structure 320. The catalog may also include metadata describing what the variables are and where the variables came from such as data type, original source variables, timestamp, access restrictions, sensitivity of the data, and/or other descriptive metadata. For example, internal data and/or personally identifiable information (PII) may be flagged as sensitive data subject to access restrictions by metadata corresponding to the variable containing the internal data and/or PII. Metadata may be copied from the storage formats 301 or generated separately for virtualized database structure 320.

Phrases and terms similar to "internal data" and "PII" may include any identifying or sensitive data related to an individual. For example, PII may include data that a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given period. Consumer transactional data may include, for example, transaction amount, transaction time, transaction vendor/merchant, and transaction vendor/merchant location.

In various embodiments, virtualized database structure 320 may provide a single, unified, and virtualized data storage format that catalogues accessible variables and provides a single access point for records stored on data storage formats 301. Client 322 (which may operate using similar hardware and software to client 210 of FIG. 1) may access data stored in various data storage formats 301 via the virtualized database structure 320. In that regard, virtualized database structure 320 may be a single access point for data stored across the various data storage formats 301 on DFS 302.

In various embodiments, virtualized database structure 320 may store and maintain the catalog of variables including locations and descriptive metadata, but virtualized database structure 320 may not store the actual data contained in each variable. The data that fills the variables may be stored on DFS 302 using data storage formats 301. Virtualized database structure 320 may enable read and write access to the data stored in data storage formats 301 without a client system having knowledge of the underlying data storage formats 301.

For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each are herein incorporated by reference in their entirety for all purposes.

Figure 4:
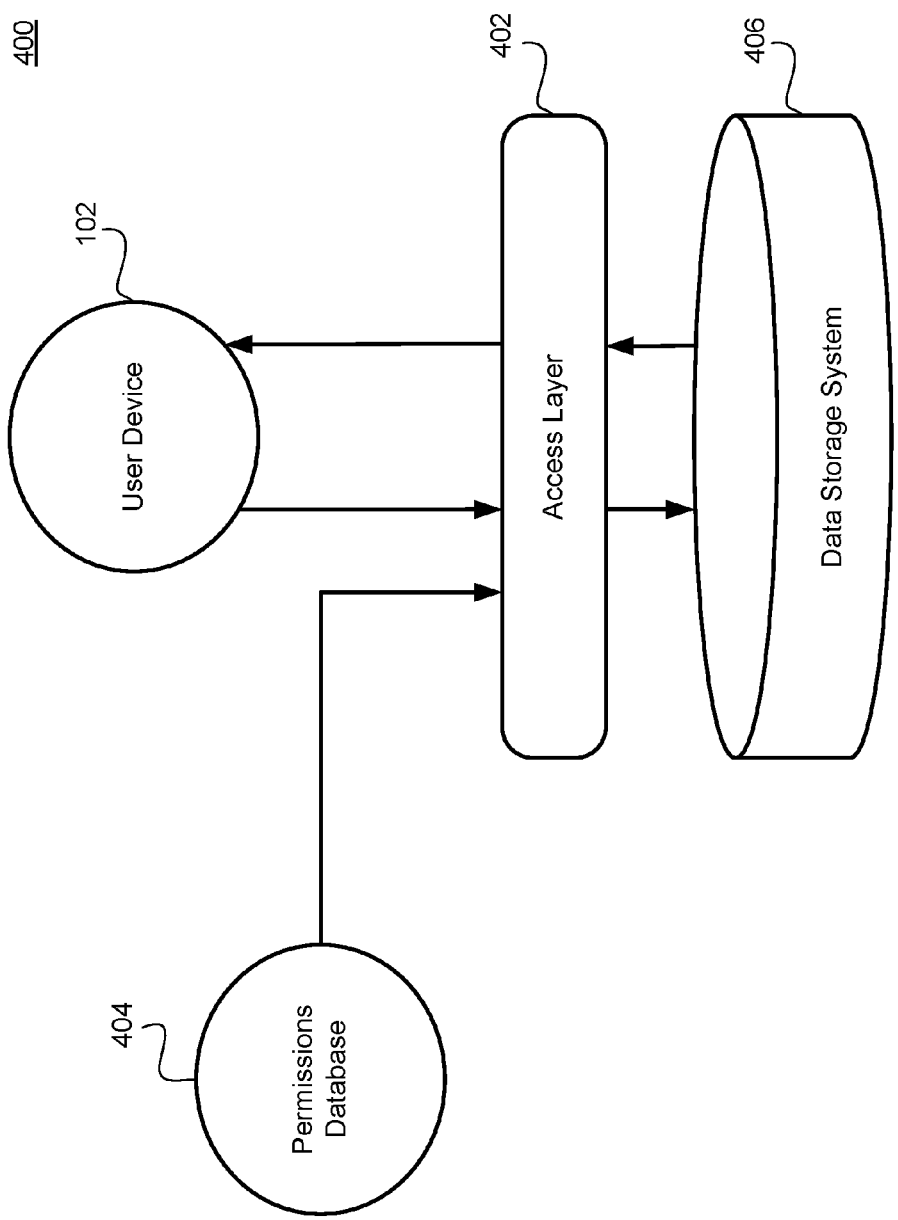
FIG. 4 illustrates an exemplary system for implementing role-based access control through an access layer and permissions database, in accordance with various embodiments.

Referring now to FIG. 4, an exemplary system 400 for providing access to electronic files with role-based access controls is shown, in accordance with various embodiments. User device 102 may be in electronic communication with an access layer 402. Access layer 402 may be configured to restrict access to sensitive data based on role-based permissions. Access layer 402 may be in communication with a permissions database 404 that includes permissions for access to various types of data. The permissions database 404 may be partially or fully compatible with POSIX standards. The access permissions may be partially or fully set at the data type, file level, or any other suitable level. Permissions database 404 may contain a partial or full list of roles applicable to a user, group, or other entity.

Access layer 402 may retrieve files from data storage system 406. Data storage system 406 may be configured to allow partial or full read and/or write access to various files stored thereon. Data storage system 406 may write files during write operations along with role-based permissions indicating the roles that a user should have to access the files. The role-based permissions may include a list of roles that a user originally used to retrieve the data that is now stored in a file. The role-based permissions may be partially or fully applied on a column, row, field, and/or file level during read operations to limit access to sensitive data. The permissions may include a string of permissions written to the file. The permissions may also include one or more bit flags written to the file. Each permission may indicate partial or full access is allowable to various data types such as, for example, PII, account numbers, account data, addresses, names, gender, age, or any other identifiable data type.

For example, a set of 8 bit flags may be written to a file (or to a column, row, or field) to indicate the roles that a user should have to permissibly access the data. The user may have read permissions for 7 of the 8 permissions (e.g., 1011 1111), with each bit representative for a different type of data. The user may query data storage system 406 to retrieve data to which access is protected based on the user having 4 (e.g., 1001 0110) out of the 8 permission flags. The file resulting from the query may include the embedded permissions (e.g., 1001 0110) indicating that those 4 access permissions are required to partially or fully view the file while the remaining 4 do not impact read access to the file. Thus, continuing the example, if the user's read permissions are changed to contain 6 of the 8 permissions (0011 111) and the file has embedded permissions (1001 0110), the user will be partially or fully denied access to the file because his first permission flag is set to 0 rather than the requisite first 1 embedded in the file. In the above example, the user may be partially or fully denied access even though they are the owner of the file based on the embedded permissions in the file.

In various embodiments, access layer 402 may compare the permissions stored in permissions database 404 written into the files stored in data storage system 406 during read operations to partially or fully limit access. A data access request from a user may be allowed in response to the user having the roles indicated by the role-based access permissions listed in the file. The data access request may also be denied in response to the user lacking one or more role as indicated by the role-based access permissions listed in the file.

Data storage system 406 may also store files along with a validation datum to partially or fully detect tampering with the role-based permissions of a given file. The validation datum stored with a given file may be, for example, a checksum of the role-based permissions written to the file. In the event one or more role-based permission for a file is changed, the access layer 402 may partially or fully recalculate the validation datum and compare the recalculated validation datum to the validation datum written to the file. A difference between the two validation data indicate the role-based access permissions have been changed. Access layer 402 may partially or fully deny access in response to the recalculated validation datum differing from the stored validation datum. The role-based access permissions and/or validation datum may be partially or fully stored in the "extended attributes" associated with many file systems. Extended file attributes are sections of the files in a file system that can partially or fully store additional metadata beyond the typical predetermined metadata associated with every file in the filesystem. Exemplary file systems with extended attributes that may be compatible with role-based access permissions and validation datum include those associated with, for example, Linux, Windows NT, Solaris, OS/2, OS X, AIX, and FreeBSD. Access layer 402 may be partially or fully integrated into the data storage system 406 and run on the same hardware. Access layer 402 may also run as a separate utility to the file system code. The role-based attributes and validation datum may also be accounted for when developing a new file system and partially or fully incorporating access layer 402 into the file system code.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

Figure 5:
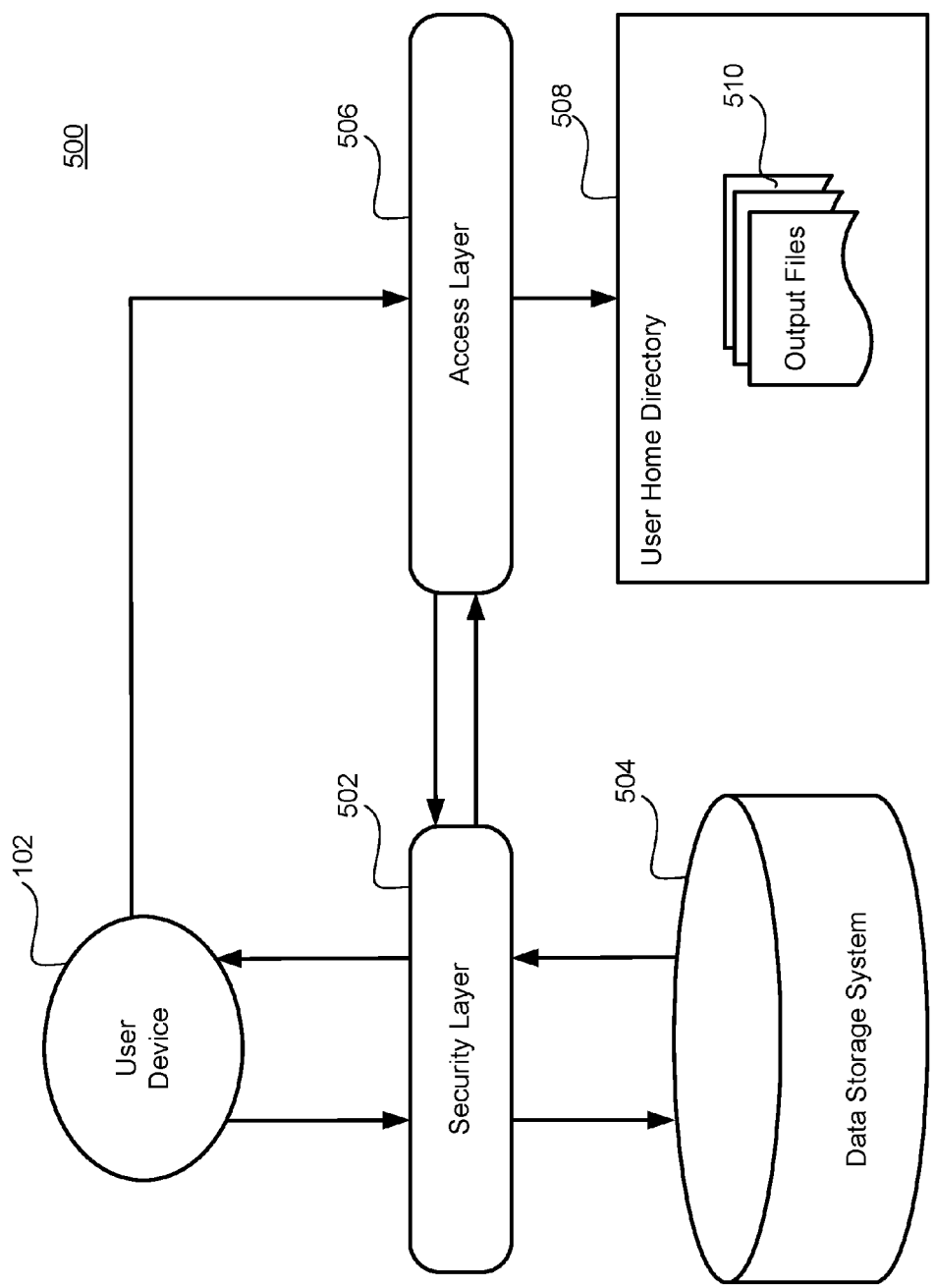
FIG. 5 illustrates an exemplary system for implementing role-based access controls through an access layer in a big data environment, in accordance with various embodiments.

With reference to FIG. 5, an exemplary system 500 for providing partial or full access to electronic files with role-based access controls through security layer 502 is shown, in accordance with various embodiments. Security layer 502 may be configured to allow data to be partially or fully encrypted at rest on disk. Security layer 502 may also apply permission settings at a column level. For read operations, security layer 502 may return scrambled values in response to user queries where the role-based access permissions indicate the user should not have access. Security layer 502 may also return partially or fully decrypted values in response to user queries where the role-based access permissions indicate the user has appropriate permissions. Security layer 502 may also include a permission database similar to permissions database 404. An exemplary security layer 502 is described in detail in U.S. patent application Ser. No. 14/968,323, entitled "System and Method for Data Security on Big Data Sets," which is incorporated herein in its entirety for all purposes.

In various embodiments, a user device 102 may issue a query for data storage system 504 through security layer 502. Security layer 502 may check the user's permissions for data and retrieve the data in a format appropriate for the user permissions. The data may be partially or fully encrypted at rest in data storage system 504, and security layer 502 may partially or fully decrypt the data responsive to the user query and unscramble data as appropriate based on the user permissions. The query results may then be returned to user device 102. The user device 102 may redirect the results to an output file 510 for writing to disk in user home directory 508. The user home directory may be located in data storage system 504. Access layer 506 may retrieve from security layer 502 the permissions invoked by the user to access the particular data contained in the query results. Access layer 506 may encode the relevant permissions into the file during the write operations. The permissions may be written in a form similar to the permissions described above with reference to FIG. 4. Access layer 506 may also write a validation datum to the file similar to the validation datum described above with reference to FIG. 4.

Figure 6:
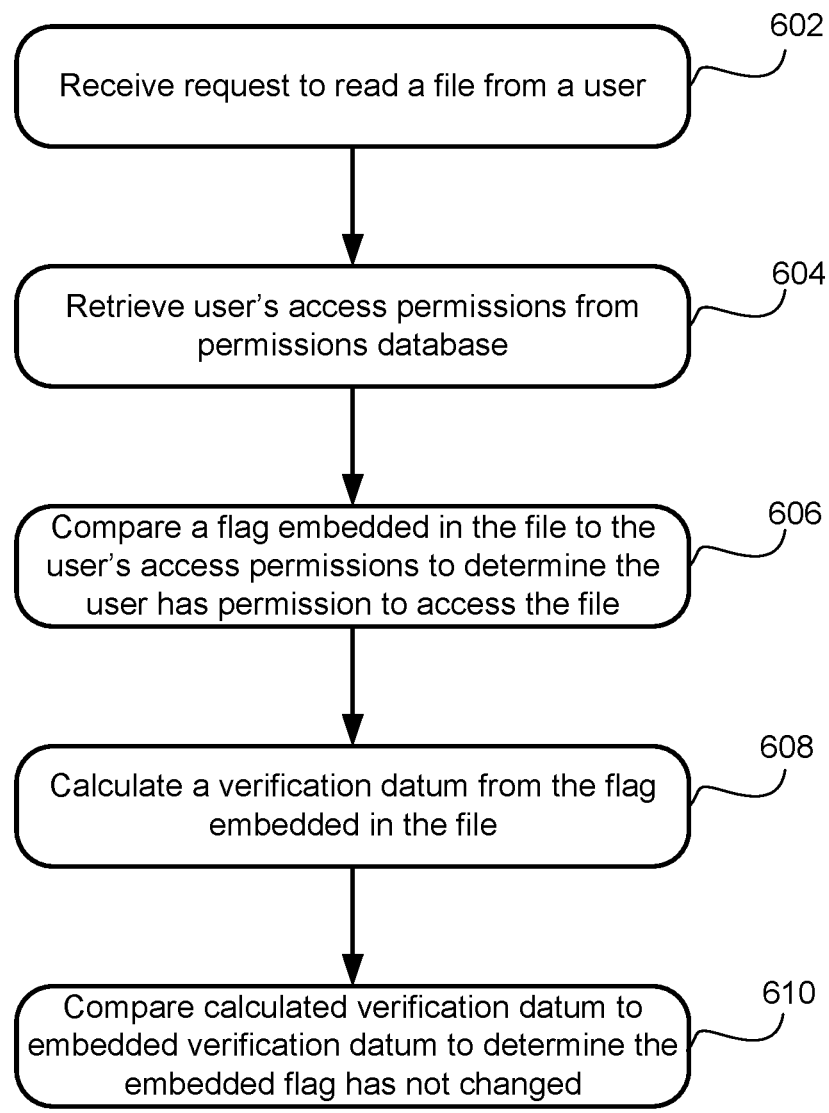
FIG. 6 illustrates an exemplary process for controlling user read access to files on a system for implementing role-based access controls, in accordance with various embodiments.

Referring now to FIG. 6, an exemplary process 600 is shown for partially or fully applying role-based access permissions in response to a request to access a file, in accordance with various embodiments. A user may request a file (Block 602) by, for example, requesting access on user device 102. Access layer 402 may partially or fully retrieve the permissions embedded in the requested file as described above with reference to FIGS. 4 and 5. Access layer 402 may then retrieve the user's access rights from the permissions database 404 and/or security layer 502 (Block 604), as described above in FIGS. 4 and 5.

In various embodiments, access layer 402 may compare the file permissions embedded in the file to the user's access rights to determine whether the user has sufficient permissions to access the file (Block 606). The file permissions may be in the form of a series of bit flags, a string, another type of flag, or any suitable format for conveying the permissions requisite for reading a file, for example. Access layer 402 may compare the user's access rights to the file permissions by partially or fully generating the string of user access rights and comparing it to the string of permissions written in the file. Access layer 402 may also compare the user's access rights to the file permissions by identifying which bit flags from a series of bit flags are set and determining or identifying the user permissions for each data type for which the bit flag is set. The user should have access permission for each data type written in the file in order to read the file. Access layer 402 may calculate a verification datum from the permission embedded in the file (Block 608). Access layer 402 may compare the calculated verification datum to the verification datum embedded in the file to determine the permission embedded in the file has not changed (Block 610).

In various embodiments, access layer 402 may return an error if the file does not exist, if the user does not have the requisite access permission, or if the validation data does not match. The user may open the file in response to the user having the requisite access permissions to read the file.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Figure 7:
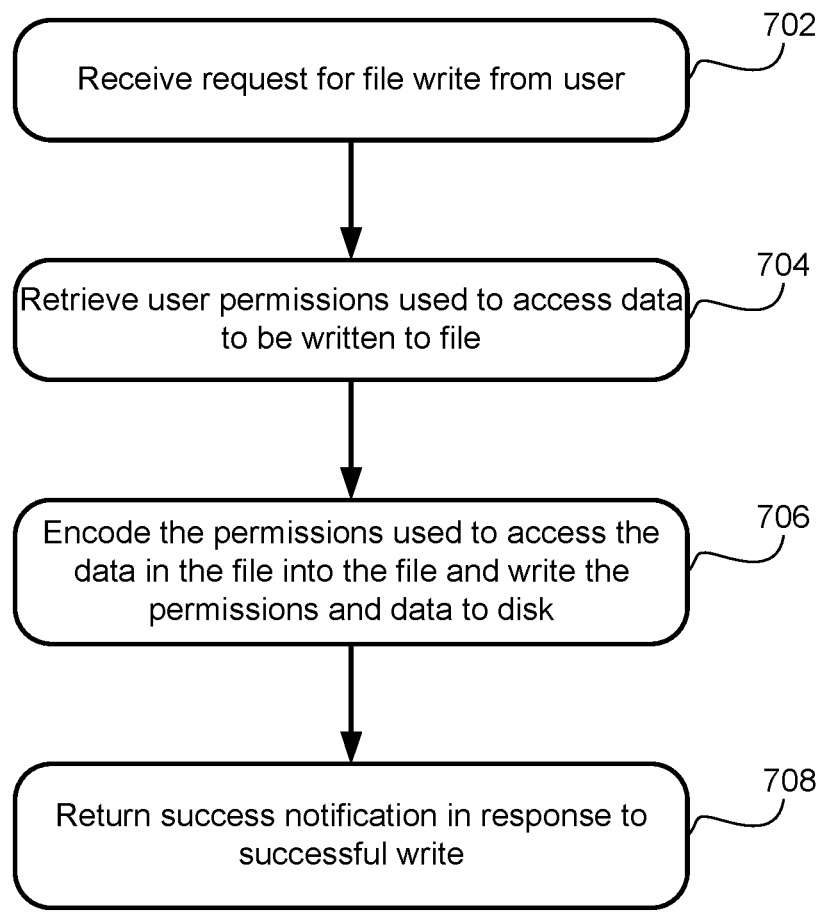
FIG. 7 illustrates an exemplary process for controlling user write access to files on a system for implementing role-based access controls, in accordance with various embodiments.

With reference to FIG. 7, an exemplary process 700 is shown for embedding access permissions and/or validation datum in files during write operations, in accordance with various embodiments. Access layer 402 may receive a request to write a file for a user (Block 702). Access layer 402 may identify user permissions that are requisite to access data to be written to file (Block 704). The requisite permissions may be identified by retrieving the user's permissions at the time the data is retrieved from data storage system 406 to be written to a new file. The requisite permissions may also be identified by determining which user permissions were used to retrieve the data to be written to file. For example, data storage system 406 may identify the access permission requisite to read each column returned in a query, and those permissions may be embedded in the file.

In various embodiments, access layer 402 may partially or fully encode the identified permissions into the file that are requisite to read the data stored in the file, and access layer 402 may write the permissions and data to disk (Block 706). Access layer 402 may also embed a validation datum such as a result from a checksum based on the identified permissions into the file and write the validation datum, permissions, and file to disk. Access layer 402 may return a success notification in response to a successful write operation (Block 708).

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert.

More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file.

The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, nonrelational, hierarchical, graphical, or object-oriented structure and/or any other database configurations including various big data products available from the Apache Software Foundation as described above. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE® ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    writing, by a data storage system, a file to a storage media, wherein the file contains data, an embedded flag, and an embedded verification datum of the embedded flag, wherein the embedded flag indicates an access permission requisite for file access;
    receiving, by the data storage system, a request to access the file from a user;
    retrieving, by the data storage system, the access permission for the user;
    comparing, by the data storage system, the embedded flag to the access permission for the user to determine the user has permission to access the file;
    calculating, by the data storage system, a verification datum; and
    comparing, by the data storage system, the calculated verification datum to the embedded verification datum to determine the embedded flag has not changed.

2. The method of claim 1, further comprising identifying, by the data storage system, the access permission associated with the embedded flag as requisite for the file access and writing the file to the storage media.

3. The method of claim 1, wherein the embedded flag comprises at least one of a bit flag or a string.

4. The method of claim 1, further comprising executing, by the data storage system, a checksum to calculate the embedded verification datum.

5. The method of claim 1, further comprising determining, by the data storage system, that the embedded flag has not changed in response to the embedded verification datum completely matching the calculated verification datum.

6. The method of claim 1, wherein the calculating is based on the access permission.

7. The method of claim 1, wherein the access permission for the user is retrieved from a permissions database.

8. A data storage computer-based system, comprising:
    a processor; and
    a tangible, non-transitory memory configured to communicate with the processor, the tangible, non-transitory memory having instructions stored thereon that, in response to execution by the processor, cause the processor to perform operations comprising:
    writing, by the processor, a file to a storage media, wherein the file contains data, an embedded flag, and an embedded verification datum of the embedded flag, wherein the embedded flag indicates an access permission requisite for file access;
    receiving, by the processor, a request to access the file from a user;
    retrieving, by the processor, the access permission for the user;
    comparing, by the processor, the embedded flag to the access permission for the user to determine the user has permission to access the file;
    calculating, by the processor, a verification datum; and
    comparing, by the processor, the calculated verification datum to the embedded verification datum to determine the embedded flag has not changed.

9. The computer-based system of claim 8, further comprising identifying, by the processor, the access permission associated with the embedded flag as requisite for the file access before the writing the file to the storage media.

10. The computer-based system of claim 8, wherein the embedded flag comprises at least one of a bit flag or a string.

11. The computer-based system of claim 8, further comprising executing, by the processor, a checksum to calculate the embedded verification datum.

12. The computer-based system of claim 8, further comprising determining, by the processor, that the embedded flag has not changed in response to the embedded verification datum completely matching the calculated verification datum.

13. The computer-based system of claim 8, wherein the calculating is based on the access permission.

14. The computer-based system of claim 8, wherein the access permission for the user is retrieved from a permissions database.

15. A method comprising:
receiving, by a data storage system, a request to write a file comprising data retrieved from the data storage system;
identifying, by the data storage system, an access permission requisite to read the data from the data storage system;
writing, by the data storage system, the file containing the data and the access permission requisite to read the data;
receiving, by the data storage system, a request to access the file from a user;
retrieving, by the data storage system, an access permission for the user;
retrieving, by the data storage system and from the file, the access permission requisite to read the data;
comparing, by the data storage system, the access permission requisite to read the data to the access permission for the user to determine the user has permission to access the file;
executing, by the data storage system, a checksum with an input comprising the access permission requisite to read the data, wherein a stored verification datum is a result of the checksum;
calculating, by the data storage system, a verification datum based at least in part on the access permission requisite to read the data; and
comparing, by the data storage system, the calculated verification datum to the stored verification datum embedded in the file.

16. The method of claim 15, wherein the access permission is inherited from at least one of roles of the user or associated files in response to the file being written.

17. The method of claim 16, further comprising automatically tagging the file with access roles to access the file.

18. The method of claim 16, further comprising determining, by the data storage system, that the access permission requisite to read the data has not been changed in response to the calculated verification datum completely matching the stored verification datum.

19. The method of claim 15, wherein the data storage system comprises a distributed file system.

20. The method of claim 15, wherein the access permission for the user is retrieved from a permissions database.

* * * * *